(12) United States Patent
Zillman et al.

(10) Patent No.: US 9,053,542 B2
(45) Date of Patent: Jun. 9, 2015

(54) IMAGE RESAMPLING BY FREQUENCY UNWRAPPING

(71) Applicant: CANON KABUSHIKI KAISHA, Tokyo (JP)

(72) Inventors: Richard James Zillman, Artarmon (AU); Kieran Gerard Larkin, Putney (AU); Peter Alleine Fletcher, Rozelle (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 13/863,985

(22) Filed: Apr. 16, 2013

(65) Prior Publication Data

US 2013/0279805 A1    Oct. 24, 2013

(30) Foreign Application Priority Data

Apr. 20, 2012    (AU) ............................... 2012202349

(51) Int. Cl.
  *G06T 5/00* (2006.01)
  *G06T 5/20* (2006.01)
  *G06T 3/40* (2006.01)

(52) U.S. Cl.
  CPC ............... *G06T 5/003* (2013.01); *G06T 5/002* (2013.01); *G06T 5/20* (2013.01); *G06T 3/4084* (2013.01)

(58) Field of Classification Search
  CPC ....... G06T 3/4084; G06T 5/002; G06T 5/003; G06T 5/20
  USPC ................ 382/275, 299, 261, 264, 290, 170; 345/606, 582; 375/277; 356/491
  See application file for complete search history.

(56) References Cited

U.S. PATENT DOCUMENTS 4,523,230 A * 6/1985 Carlson et al. ............... 348/623
6,731,342 B2 * 5/2004 Shin et al. .................... 348/452
(Continued)

FOREIGN PATENT DOCUMENTS

JP    P2001-266140 A    9/2001
JP    P2006-155179 A    6/2006
(Continued)

OTHER PUBLICATIONS

Takeda, Hiroyuki, Sina Farsiu, and Peyman Milanfar. "Kernel Regression for Image Processing and Reconstruction", IEEE Transactions on Image Processing 16.2 (2007): 349-366.
(Continued)

*Primary Examiner* — Mekonen Bekele
(74) *Attorney, Agent, or Firm* — Canon USA, Inc. IP Division

(57) ABSTRACT

A method determines at least one image value of a corresponding desired output position of an output image from an input image. An orientation of an edge passing through the output position is determined in a localised region of the input image. A frequency spectrum for the region of the input image is extended. A main frequency band of the edge is aligned in the extended frequency spectrum parallel to a first sampling axis of a grid based on the orientation of the edge. The grid is selected from a set of the input and output grids. The aligned main frequency band is filtered along a second sampling axis of the grid, orthogonal to the first sampling axis, the filter removing frequencies associated with replica bands and maintaining the main frequency band. The image value is determined from the filtered edge at the desired output position.

13 Claims, 17 Drawing Sheets

(56) References Cited

U.S. PATENT DOCUMENTS

| | | | |
|---|---|---|---|
| 7,043,082 B2* | 5/2006 | Larkin et al. | 382/210 |
| 7,483,040 B2* | 1/2009 | Michel | 345/606 |
| 7,856,154 B2 | 12/2010 | Young | |
| 7,982,798 B2* | 7/2011 | Adams | 348/448 |
| 8,208,748 B2* | 6/2012 | Joon-Ki et al. | 382/264 |
| 8,260,089 B2 | 9/2012 | Tonisson et al. | |
| 8,462,349 B1* | 6/2013 | Rhoadarmer et al. | 356/491 |
| 8,571,312 B2* | 10/2013 | Chang et al. | 382/167 |
| 2008/0212895 A1 | 9/2008 | Mattox | |
| 2009/0262247 A1 | 10/2009 | Huang et al. | |
| 2009/0316240 A1* | 12/2009 | Hara | 359/33 |
| 2013/0272626 A1* | 10/2013 | Robinson | 382/275 |

FOREIGN PATENT DOCUMENTS

| | | |
|---|---|---|
| JP | 2009-049562 A | 3/2009 |
| JP | 2011-100424 A | 5/2011 |
| JP | 2012-045065 A | 3/2012 |

OTHER PUBLICATIONS

Reichenbach, Stephen E., Stephen K. Park, and Ramkumar Narayanswamy. "Characterizing digital image acquisition devices." Optical Engineering 30.2 (1991): 170-177.

* cited by examiner

IMAGE RESAMPLING BY FREQUENCY UNWRAPPING

REFERENCE TO RELATED APPLICATION(S)

This application claims the benefit under 35 U.S.C. §119 of the filing date of Australian Patent Application No. 2012202349, filed Apr. 20, 2012, hereby incorporated by reference in its entirety as if fully set forth herein.

TECHNICAL FIELD

The present invention relates to digital image processing and, in particular, to a method and apparatus for processing an input image including determining an image sample of an output image having recovered aliased frequencies.

BACKGROUND

When an image of a scene is sampled (e.g. during capture of the image at the sensor in a digital camera), aliasing will occur in the captured image if the density of samples is not sufficiently high. The density of the samples is determined by the configuration of the sensor and the lens system of the camera and describes a resolution to which the image of the scene may be captured. Aliasing occurs when the image being sampled contains frequencies that are higher than the Nyquist limit $1/(2d)$ where d represents spacing between samples. Aliasing may be removed by optically low-pass filtering the image at capture to remove the frequencies susceptible to aliasing. Unfortunately, as low-pass filtering blurs the image, camera optics are typically designed such that images are slightly under-sampled to improve the apparent sharpness of the sampled image. This applies also to computer generated images where similar sharpness is desirable. Many methods of rendering computer graphics also introduce aliasing.

Small amounts of aliasing are not usually detected when viewing the captured image. However, when an image is resampled at a higher resolution, the aliasing in the original image is magnified and becomes much more visible in the higher resolution image. Artefacts caused by aliasing are especially visible along edges in the image data, where they are sometimes referred to as "jaggies". Such artefacts are a significant cause of quality degradation in up-scaled images.

Increasing the resolution of an image is generally performed using an interpolation process to generate pixels of the higher resolution image from pixels of the input image. Many methods based on modifying the interpolation process in the presence of edge shave been proposed to deal with problems due to aliasing. For example the resulting sharpness produced by an interpolating kernel may be varied in edge regions or a kernel may be selected that is modified or oriented to match the orientation of an edge. In some techniques, pixel patterns are matched to dictionaries that provide specific interpolation rules to generate the missing output sample. Machine learning methods have also been proposed as a means of generating the interpolation rules while others use hand coded rules. Many of these methods suffer from the fact that edge orientations are quantized which creates visible artefacts at the boundaries between regions where different kernels have been applied. Other methods are constrained because their rules can only be applied to fixed rate interpolation. All methods based on modifying the interpolation process suffer from unpredictable artefacts that are a result of their empirical or arbitrary construction. To prevent such artefacts it is necessary to moderate the use of the techniques, often via separate sets of rules which add further unpredictability and complexity and may actually degrade image quality in certain circumstances.

More theoretical methods that optimise the kernel selection according to the data have been proposed but these are typically iterative techniques that remain too complex to implement in hardware for consumer electronics.

It is the aim of almost all adaptive interpolation algorithms to remove aliased frequencies, as they are the cause of jagged artefacts. However, by removing aliased frequencies, the edges of the resultant image are blurred. To produce the sharpest upsampled image, the aliased frequencies should be recovered, rather than removed.

There is, therefore, a need for an efficient interpolation method that is able to restore aliased frequencies, without introducing additional artefacts.

SUMMARY

It is an object of the present invention to substantially overcome, or at least ameliorate, one or more disadvantages of existing arrangements.

According to a first aspect of the present disclosure there is provided, a method of determining at least one image value of a corresponding desired output position on an output grid of an output image from an input image on an input grid, the method comprising:

(a) determining, in a localised region of the input image, an orientation of an edge passing through the output position;

(b) extending a frequency spectrum for the region of the input image;

(c) aligning a main frequency band of the edge in the extended frequency spectrum parallel to a first sampling axis of a grid based on the orientation of the edge, wherein the grid is selected from the set of the input and output grids;

(d) filtering the aligned main frequency band along a second sampling axis of the grid, orthogonal to the first sampling axis, the filter removing frequencies associated with replica bands and maintaining the main frequency band;

(e) determining the image value from the filtered edge at the desired output position; and (f) storing the determined image value as part of the output image.

According to a second aspect of the present disclosure, there is provided a method of determining an image value at a desired output position on an output grid of an output image at a first resolution from an input image on an input grid at a second resolution, the method comprising the steps of:

estimating in a region of the input image an orientation of an edge passing through the output sample position;

determining a location for each of a plurality of auxiliary points where the auxiliary points are located at an intersection of the edge and a first direction determined according to the orientation;

selecting, for each of the plurality of auxiliary points, a first filter based on the location of the auxiliary point in the first direction of the input grid, said first filter being adapted to unwrap aliasing frequencies in the input image;

determining a value of each said auxiliary point by applying the selected filter in the first direction;

selecting a second filter of a plurality of filters based on the output position relative to the input grid in a second direction of the input grid; and determining the image value at the desired output position by applying the second filter to said value of the plurality of auxiliary points along the edge;

According to still another aspect of the present disclosure, there is provided a method of upsampling a low-resolution input image to form a high-resolution output image at a desired output resolution, said method comprising:

determining a local orientation value of a localised region in the input image;

default upsampling the input image using the desired output resolution to form a first image;

orientation adaptively upsampling the input image at each localised region thereof using the determined local orientation value according to the method of either the first or second aspects to form a second image; and combining the first image and the second image using the determined local orientation value to form the output image at the desired resolution.

According to still another aspect of the present disclosure, there is provided an apparatus for implementing any one of the aforementioned methods.

According to still another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Brief Introduction of Aliasing

When an image of a scene is captured, for example by a camera, the image is sampled at discrete points and the samples are stored as image pixel values, or simply "pixels", to form a captured image. One common method for sampling the scene at discrete points is to use a rectangular sampling input grid applied to the input image. Upsampling can then be used on the captured image to increase the resolution of the sampled image. During the upsampling process, output samples, being output image pixel values, are calculated by applying an interpolation method, such as bilinear interpolation, to the input samples.

When an image contains an oriented high frequency feature, such as an edge, and the image was sampled using a rectangular sampling grid, aliasing will appear as a repeated stepping pattern along the feature when the captured image is displayed. The repetition is indicative of frequencies at which aliasing appears, the frequencies being a function of the resolution of the image and the sampling frequency. When interpolation is used to reconstruct a higher resolution image from a captured image, the aliased frequencies produce a periodic variation of intensity in the reconstructed output image pixel values along lines or curves that are of approximately constant intensity in the scene. The orientation of a line or edge is defined as a vector configured 90 degrees or normal to the line or edge at a particular point on the line or edge. The direction of the orientation vector, representing the angle between the positive x axis and the vector, is taken to be between zero and 180 degrees, as a line or edge orientated at x degrees is indistinguishable from the same edge or line orientated at (x+180) degrees. Alternatively, to avoid this ambiguity, the orientation of an image feature may be represented using a double angle representation, in which the angle between the x-axis and the orientation vector is doubled.

Aliasing in the Spatial and Fourier Domains

Figure 1:
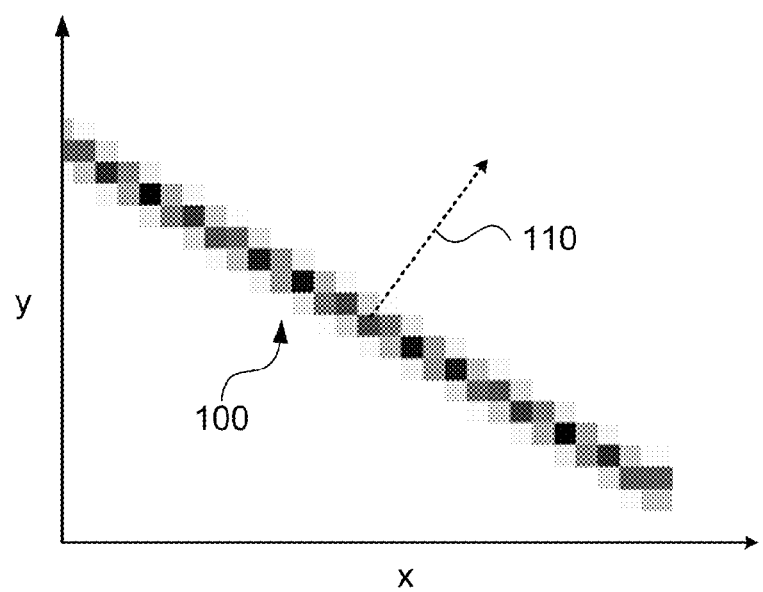
FIG. 1 shows an under-sampled line in the spatial domain.
Figure 2:
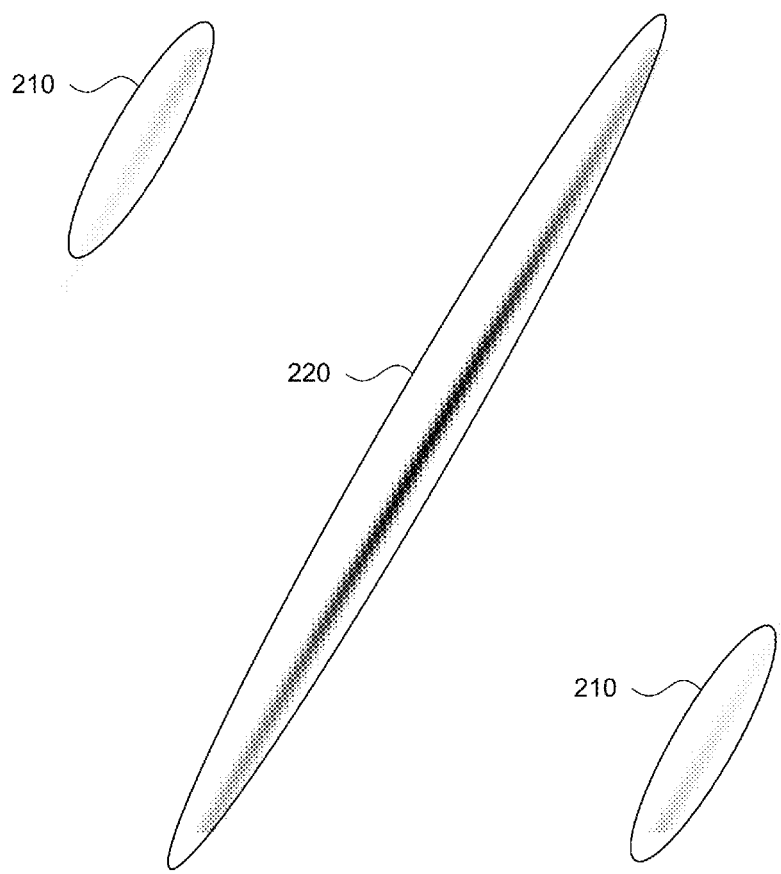
FIG. 2 shows the spectrum of an under-sampled line.

FIG. 1 shows a sampled image of a line 100 having an orientation 110 and which has been sampled at a rate below that required by the sampling theorem described by Nyquist and discussed above. That is, the image has been undersampled, and hence contains aliasing. The magnitude spectrum of the line 100 of FIG. 1 is shown in FIG. 2, where the aliased frequencies 210 are clearly visible and distinct from a fundamental or main frequency component 220. In FIG. 2 each of the frequencies 210 and 220 are encircled to assist in identification in the illustration, noting that the end frequencies taper to low intensities which may not be visible against the white page background, subject to the quality of reproduction of FIG. 2. The aliased frequencies 210 occur due to insufficient bandwidth, which causes the component 220 to wrap. In the spatial domain, these aliased frequencies appear as a periodic variation of intensity along the line. The periodic variation of intensity appears as a 'jagged' artefact along the line, seen clearly in the spatial domain representation of FIG. 1. The frequency of the jagged artefact is determined by the orientation 110 of the image feature 100. For image features orientated at 45 degrees to an axis of the sampling grid, the frequency of aliasing is maximized, while for image features orientated parallel to the horizontal and vertical axes, the frequency of aliasing is minimized. That is, for image features parallel to the horizontal and vertical (orthogonal) axes via which sampling is performed, there is no variation of intensity along the image feature. Image features orientated at an angle greater than 45 degrees and less than 135 degrees are referred to as 'near horizontal', while image features orientated an angle less than 45 degrees or greater than 135 degrees are considered 'near vertical'.

Adaptive Upsampling Architecture

Figure 3:
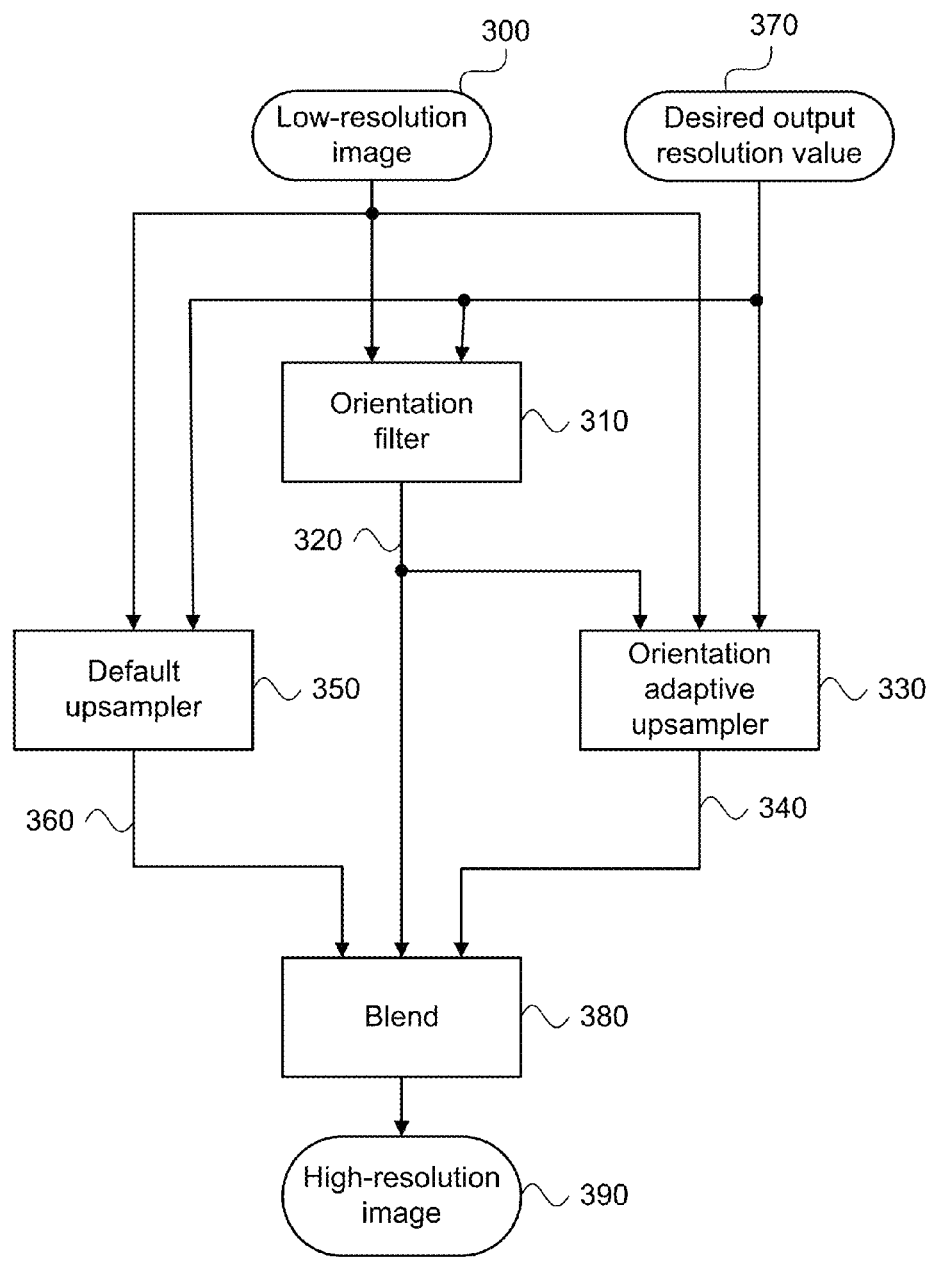
FIG. 3 is a schematic block diagram of an orientation adaptive image upsampling system.

An example architecture of an image upsampling method 399 that features orientation adaptive filtering is shown in FIG. 3. A low-resolution image 300 and a desired output resolution value 370 are input to the method which outputs a high-resolution image 390 at the desired output resolution 370. The high-resolution image 390 is formed by combining a first image 360 and second image 340 by a blend stage 380. This is an adaptive upsampling method that relies upon determining a local structure of the input image 300, but at the output resolution 370. That is, sub-pixel precision, relative to the resolution of the low-resolution image 300 is required from the orientation estimation process. The first image 360 is generated by upsampling the low-resolution image 300 to the output resolution 370 using a data-independent (default) upsampling stage 350. The data-independent upsampling stage 350 may use methods such as bilinear interpolation and bicubic interpolation.

The second image 340 is obtained by upsampling the low-resolution image 300 to the output resolution 370 using an orientation-adaptive upsampling stage 330. The orientation-adaptive upsampling stage 330 takes as input the low-resolution image 300, the output resolution 370, and a local orientation estimate 320. The local orientation estimate 320 is calculated by an orientation filter 310, which estimates the orientation of a localised region in the input image 300 corresponding to a sub-pixel location for each pixel of the output image 390. The orientation filter 310 takes as input the low-resolution image 300 and output resolution 370, and operates to ascertain the orientation of a high frequency transition, such as an edge, in or passing through a localised region of the input image 300 corresponding to a desired output sample position in the high-resolution image 390. Operation of a specific example of the filter 310 will be described later with reference to FIG. 14.

Based on the local orientation in the localised region determined by the filter 320, the adaptively upsampled image 340 is combined with the interpolated image 360 on a per-pixel basis by the blend stage 380 to produce the high-resolution image 390. That is, each pixel of the high-resolution image 390 is selected from either the orientation-adaptive upsampled image 340 or the interpolated image 360. To do so, a measure of the consistency of orientation vectors for a localised region surrounding each output pixel is required. The consistency of orientation for a region may be estimated by calculating the vector sum of all orientation vectors in the region, and normalizing the result by the sum of the magnitude of each orientation vector in the region. This method gives a value of one if every orientation vector in a region has the same orientation. When the orientation consistency is high, the adaptively upsampled image 340 is selected by the blend stage 380, otherwise the interpolated image 360 is selected.

Image Upsampling by Unwrapping Aliased Frequencies

As discussed above, aliasing causes significant jagged artefacts when upsampling an undersampled image using a standard resampling method such as bilinear or bicubic interpolation. Such artefacts are avoided according to the present disclosure by unwrapping the aliased frequencies before performing data-independent upsampling. By unwrapping the aliased frequencies, which are determined by the orientation of an image feature, the high-resolution spectrum of an image feature is recovered. An unwrapped frequency spectrum may also be referred to as an extended frequency spectrum. Resampling an image by unwrapping aliased frequencies is an orientation adaptive technique, and, in one arrangement, implemented by the orientation adaptive stage 330 of FIG. 3.

Hardware Implementation

Figure 17A:
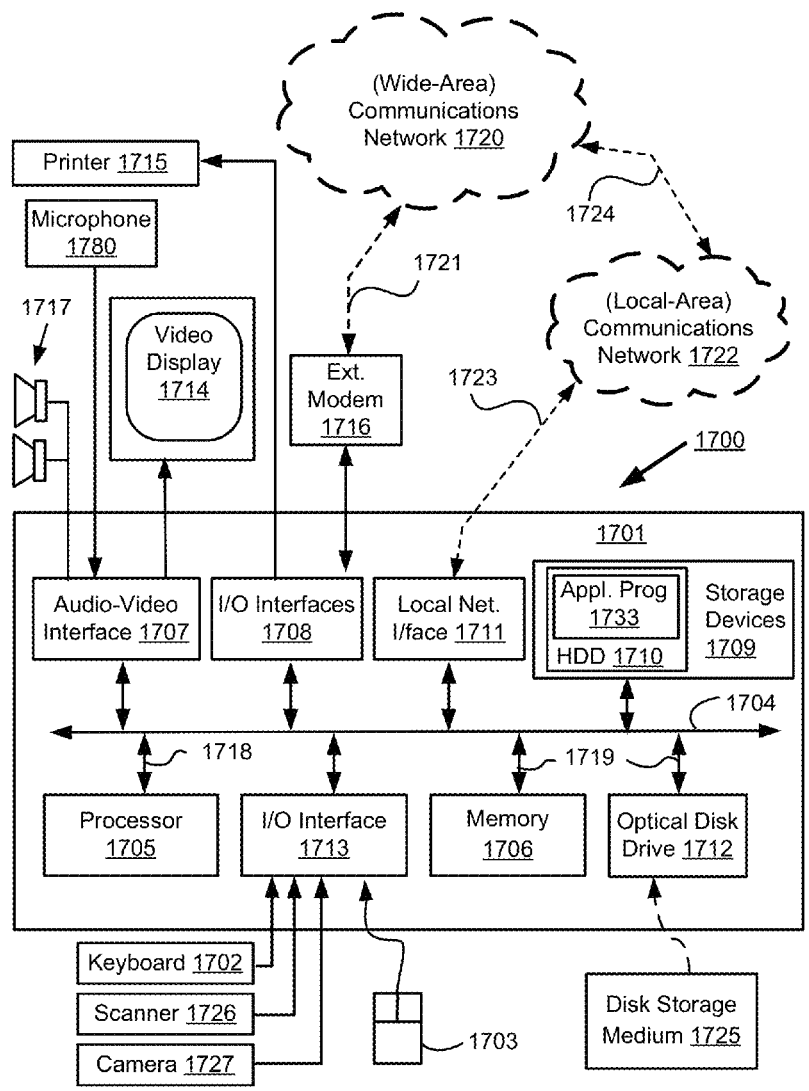
FIGS. 17A and 17B collectively form a schematic block diagram representation of an electronic device upon which described arrangements can be practised.
Figure 17B:
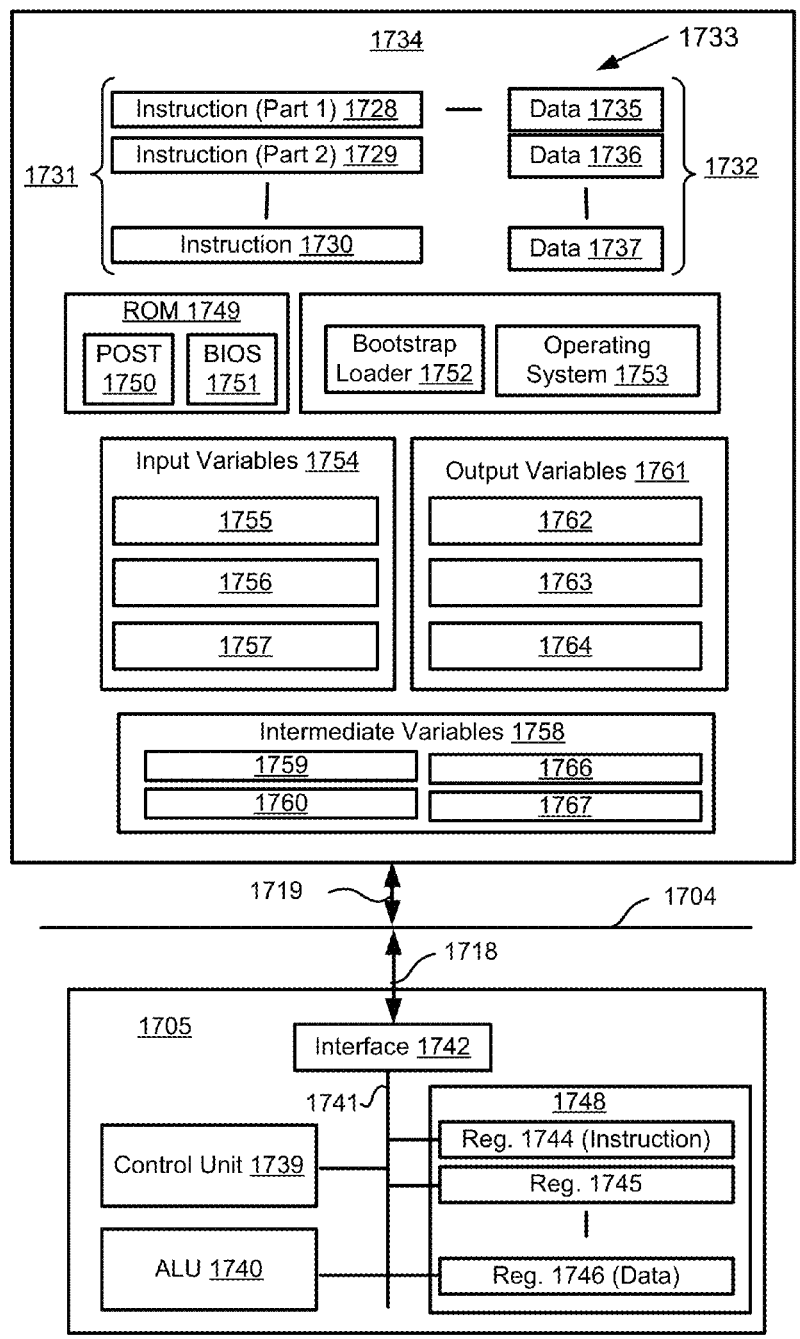

FIGS. 17A and 17B depict a general-purpose computer system 1700, upon which the architecture of FIG. 3 and various arrangements to be described can be practiced.

As seen in FIG. 17A, the computer system 1700 includes: a computer module 1701; input devices such as a keyboard 1702, a mouse pointer device 1703, a scanner 1726, a camera 1727 by which images may be captured, and a microphone 1780; and output devices including a printer 1715, a display device 1714 and loudspeakers 1717. An external Modulator-Demodulator (Modem) transceiver device 1716 may be used by the computer module 1701 for communicating to and from a communications network 1720 via a connection 1721. The communications network 1720 may be a wide-area network (WAN), such as the Internet, a cellular telecommunications network, or a private WAN. Where the connection 1721 is a telephone line, the modem 1716 may be a traditional "dial-up" modem. Alternatively, where the connection 1721 is a high capacity (e.g., cable) connection, the modem 1716 may be a broadband modem. A wireless modem may also be used for wireless connection to the communications network 1720.

The computer module 1701 typically includes at least one processor unit 1705, and a memory unit 1706. For example, the memory unit 1706 may have semiconductor random access memory (RAM) and semiconductor read only memory (ROM). The computer module 1701 also includes an number of input/output (I/O) interfaces including: an audio-video interface 1707 that couples to the video display 1714, loudspeakers 1717 and microphone 1780; an I/O interface 1713 that couples to the keyboard 1702, mouse 1703, scanner 1726, camera 1727 and optionally a joystick or other human interface device (not illustrated); and an interface 1708 for the external modem 1716 and printer 1715. In some implementations, the modem 1716 may be incorporated within the computer module 1701, for example within the interface 1708. The computer module 1701 also has a local network interface 1711, which permits coupling of the computer system 1700 via a connection 1723 to a local-area communications network 1722, known as a Local Area Network (LAN). As illustrated in FIG. 17A, the local communications network 1722 may also couple to the wide network 1720 via a connection 1724, which would typically include a so-called "firewall" device or device of similar functionality. The local network interface 1711 may comprise an Ethernet circuit card, a Bluetooth™ wireless arrangement or an IEEE 802.11 wireless arrangement; however, numerous other types of interfaces may be practiced for the interface 1711.

The I/O interfaces 1708 and 1713 may afford either or both of serial and parallel connectivity, the former typically being implemented according to the Universal Serial Bus (USB) standards and having corresponding USB connectors (not illustrated). Storage devices 1709 are provided and typically include a hard disk drive (HDD) 1710. Other storage devices such as a floppy disk drive and a magnetic tape drive (not illustrated) may also be used. An optical disk drive 1712 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1700.

The components 1705 to 1713 of the computer module 1701 typically communicate via an interconnected bus 1704 and in a manner that results in a conventional mode of operation of the computer system 1700 known to those in the relevant art. For example, the processor 1705 is coupled to the system bus 1704 using a connection 1718. Likewise, the memory 1706 and optical disk drive 1712 are coupled to the system bus 1704 by connections 1719. Examples of computers on which the described arrangements can be practised include IBM-PC's and compatibles, Sun Sparcstations™ Apple Mac™ or a like computer systems.

The methods of image upsampling may be implemented using the computer system 1700 wherein the processes of FIGS. 3 to 16, to be described, may be implemented as one or more software application programs 1733 executable within the computer system 1700. In particular, the steps of the upsampling methods are effected by instructions 1731 (see FIG. 17B) in the software 1733 that are carried out within the computer system 1700. The software instructions 1731 may be formed as one or more code modules, each for performing one or more particular tasks. The software may also be divided into two separate parts, in which a first part and the corresponding code modules performs the upsampling methods and a second part and the corresponding code modules manage a user interface between the first part and the user.

The software may be stored in a computer readable medium, including the storage devices described below, for example. The software is loaded into the computer system 1700 from the computer readable medium, and then executed by the computer system 1700. A computer readable medium having such software or computer program recorded on the computer readable medium is a computer program product. The use of the computer program product in the computer system 1700 preferably effects an advantageous apparatus for image upsampling or resampling using frequency unwrapping.

The software 1733 is typically stored in the HDD 1710 or the memory 1706. The software is loaded into the computer system 1700 from a computer readable medium, and executed by the computer system 1700. Thus, for example, the software 1733 may be stored on an optically readable disk storage medium (e.g., CD-ROM) 1725 that is read by the optical disk drive 1712. A computer readable medium having such software or computer program recorded on it is a computer program product. The use of the computer program product in the computer system 1700 preferably effects an apparatus for image upsampling/resampling.

In some instances, the application programs 1733 may be supplied to the user encoded on one or more CD-ROMs 1725 and read via the corresponding drive 1712, or alternatively may be read by the user from the networks 1720 or 1722. Still further, the software can also be loaded into the computer system 1700 from other computer readable media. Computer readable storage media refers to any non-transitory tangible storage medium that provides recorded instructions and/or data to the computer system 1700 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1701. Examples of transitory or non-tangible computer readable transmission media that may also participate in the provision of software, application programs, instructions and/or data to the computer module 1701 include radio or infra-red transmission channels as well as a network connection to another computer or networked device, and the Internet or Intranets including e-mail transmissions and information recorded on Websites and the like.

The second part of the application programs 1733 and the corresponding code modules mentioned above may be executed to implement one or more graphical user interfaces (GUIs) to be rendered or otherwise represented upon the display 1714. Through manipulation of typically the keyboard 1702 and the mouse 1703, a user of the computer system 1700 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1717 and user voice commands input via the microphone 1780.

FIG. 17B is a detailed schematic block diagram of the processor 1705 and a "memory" 1734. The memory 1734 represents a logical aggregation of all the memory modules (including the HDD 1709 and semiconductor memory 1706) that can be accessed by the computer module 1701 in FIG. 17A.

When the computer module 1701 is initially powered up, a power-on self-test (POST) program 1750 executes. The POST program 1750 is typically stored in a ROM 1749 of the semiconductor memory 1706 of FIG. 17A. A hardware device such as the ROM 1749 storing software is sometimes referred to as firmware. The POST program 1750 examines hardware within the computer module 1701 to ensure proper functioning and typically checks the processor 1705, the memory 1734 (1709, 1706), and a basic input-output systems software (BIOS) module 1751, also typically stored in the ROM 1749, for correct operation. Once the POST program 1750 has run successfully, the BIOS 1751 activates the hard disk drive 1710 of FIG. 17A. Activation of the hard disk drive 1710 causes a bootstrap loader program 1752 that is resident on the hard disk drive 1710 to execute via the processor 1705. This loads an operating system 1753 into the RAM memory 1706, upon which the operating system 1753 commences operation. The operating system 1753 is a system level application, executable by the processor 1705, to fulfil various high level functions, including processor management, memory management, device management, storage management, software application interface, and generic user interface.

The operating system 1753 manages the memory 1734 (1709, 1706) to ensure that each process or application running on the computer module 1701 has sufficient memory in which to execute without colliding with memory allocated to another process. Furthermore, the different types of memory available in the system 1700 of FIG. 17A must be used properly so that each process can run effectively. Accordingly, the aggregated memory 1734 is not intended to illustrate how particular segments of memory are allocated (unless otherwise stated), but rather to provide a general view of the memory accessible by the computer system 1700 and how such is used.

As shown in FIG. 17B, the processor 1705 includes a number of functional modules including a control unit 1739, an arithmetic logic unit (ALU) 1740, and a local or internal memory 1748, sometimes called a cache memory. The cache memory 1748 typically include a number of storage registers 1744-1746 in a register section. One or more internal busses 1741 functionally interconnect these functional modules. The processor 1705 typically also has one or more interfaces 1742 for communicating with external devices via the system bus 1704, using a connection 1718. The memory 1734 is coupled to the bus 1704 using a connection 1719.

The application program 1733 includes a sequence of instructions 1731 that may include conditional branch and loop instructions. The program 1733 may also include data 1732 which is used in execution of the program 1733. The instructions 1731 and the data 1732 are stored in memory locations 1728, 1729, 1730 and 1735, 1736, 1737, respectively. Depending upon the relative size of the instructions 1731 and the memory locations 1728-1730, a particular instruction may be stored in a single memory location as depicted by the instruction shown in the memory location 1730. Alternately, an instruction may be segmented into a number of parts each of which is stored in a separate memory location, as depicted by the instruction segments shown in the memory locations 1728 and 1729.

In general, the processor 1705 is given a set of instructions which are executed therein. The processor 1105 waits for a subsequent input, to which the processor 1705 reacts to by executing another set of instructions. Each input may be provided from one or more of a number of sources, including data generated by one or more of the input devices 1702, 1703, data received from an external source across one of the networks 1720, 1702, data retrieved from one of the storage devices 1706, 1709 or data retrieved from a storage medium 1725 inserted into the corresponding reader 1712, all depicted in FIG. 17A. The execution of a set of the instructions may in some cases result in output of data. Execution may also involve storing data or variables to the memory 1734.

The disclosed upsampling arrangements use input variables 1754, which are stored in the memory 1734 in corresponding memory locations 1755, 1756, 1757. The upsampling arrangements produce output variables 1761, which are stored in the memory 1734 in corresponding memory locations 1762, 1763, 1764. Intermediate variables 1758 may be stored in memory locations 1759, 1760, 1766 and 1767.

Referring to the processor 1705 of FIG. 17B, the registers 1744, 1745, 1746, the arithmetic logic unit (ALU) 1740, and the control unit 1739 work together to perform sequences of micro-operations needed to perform "fetch, decode, and execute" cycles for every instruction in the instruction set making up the program 1733. Each fetch, decode, and execute cycle comprises:

(a) a fetch operation, which fetches or reads an instruction 1731 from a memory location 1728, 1729, 1730;

(b) a decode operation in which the control unit 1739 determines which instruction has been fetched; and (c) an execute operation in which the control unit 1739 and/or the ALU 1740 execute the instruction.

Thereafter, a further fetch, decode, and execute cycle for the next instruction may be executed. Similarly, a store cycle may be performed by which the control unit 1739 stores or writes a value to a memory location 1732.

Each step or sub-process in the processes of FIGS. 3 to 16 is associated with one or more segments of the program 1733 and is performed by the register section 1744, 1745, 1747, the ALU 1740, and the control unit 1739 in the processor 1705 working together to perform the fetch, decode, and execute cycles for every instruction in the instruction set for the noted segments of the program 1733.

The methods of image upsampling, or parts thereof may alternatively be implemented in dedicated hardware such as one or more integrated circuits performing the functions or sub functions of image upsampling/resampling. Such dedicated hardware may include graphic processors, digital signal processors, for example to perform Fourier transforms, or one or more microprocessors and associated memories.

Fourier Domain Implementation of Frequency Unwrapping

Figure 4:
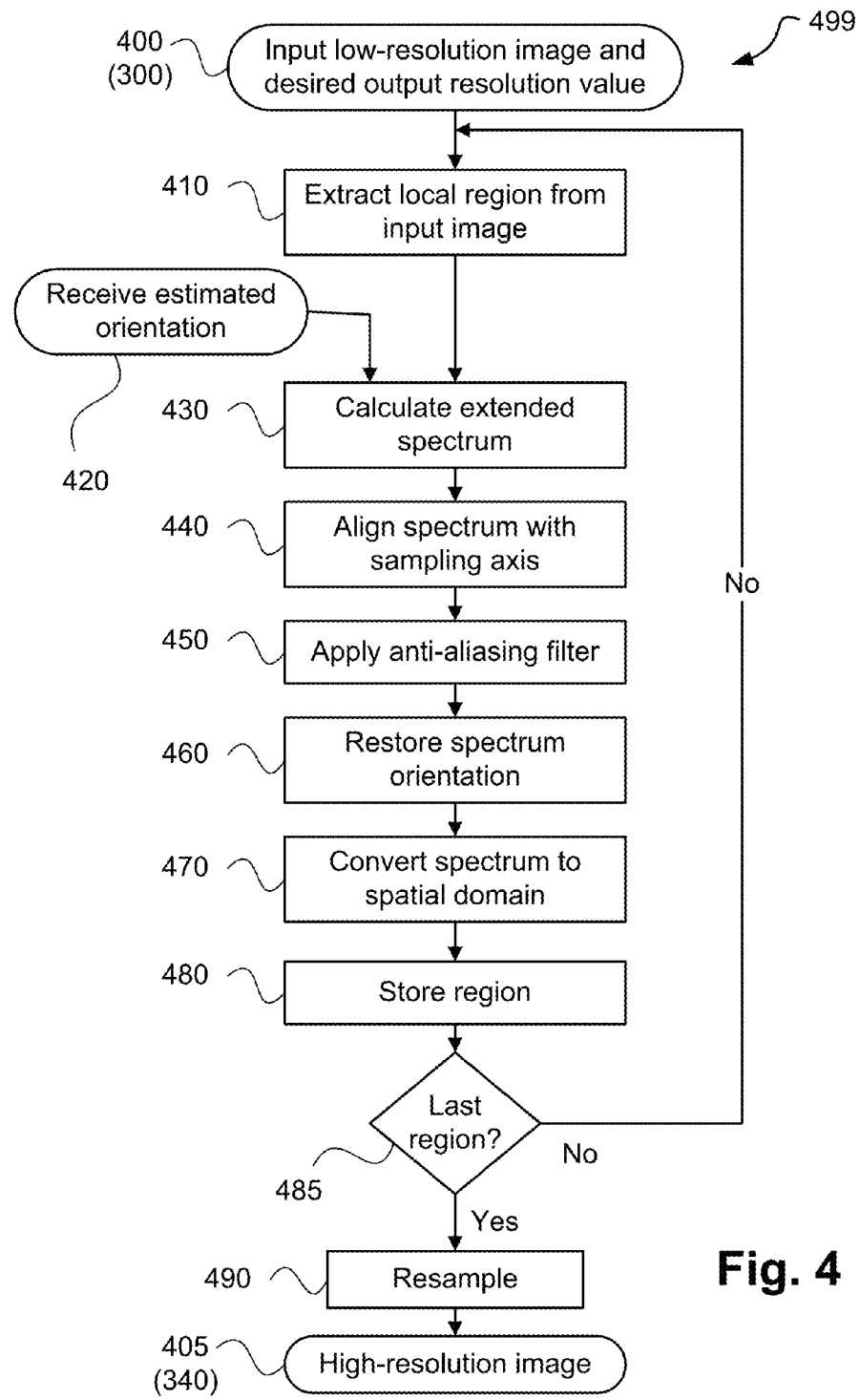
FIG. 4 is a flow diagram of a method to resample an image by frequency unwrapping in the Fourier domain.

FIG. 4 is a flow diagram of a method 499 to resample an image by frequency unwrapping in the Fourier domain, thereby extending the frequency spectrum of the input image. The method 499 is preferably performed in software, such as a component of the application program 1733 described above and executable on the computer system upon image data for example captured by the camera 1727 and stored on the HDD 1710 or alternatively supplied to the computer module 1701 from the networks 1720 and 1722 or the storage medium 1725. A desired output resolution is input to the method, which also takes as input a low-resolution image at step 400, corresponding to the low-resolution image 300 of FIG. 3, and outputs a high-resolution image 405, corresponding to the adaptively upsampled image 340 of FIG. 3. The desired output resolution may be a predetermined value or alternatively input via a user interface, such as a GUI represented on the display 1714 which may present a pick-list of exemplary output resolutions for selection of one resolution by the user. The GUI may also offer the user the opportunity to input an arbitrary desired output resolution. The method of FIG. 4 will be explained with reference to FIGS. 5, 6, 7, 8 and 9.

The method 499 starts at an extract local region stage 410 which windows out or otherwise extracts a region of the input image 400. The region is typically sized at 32×32 pixels, but a wide range of region sizes may be used. A single pixel may be used as a region, but generally a region is formed by a plurality of pixels on a grid, thus requiring at least 4 pixels. The extended frequency spectrum is thereby determined for each localised region of the input image, with each region corresponding to an output sample position in the high-resolution output image. At step 420 the method 499 receives the estimated orientation 320 from step 310. The orientation of the local region is generally at least estimated or otherwise determined using an energy tensor, gradient squared tensor, structure tensor or other such approach. Generally the region is rectangular, the orientation is aligned with axes of the input image, which typically is also rectangular, and the pixels lie on an input grid of the input image.

Figure 5:
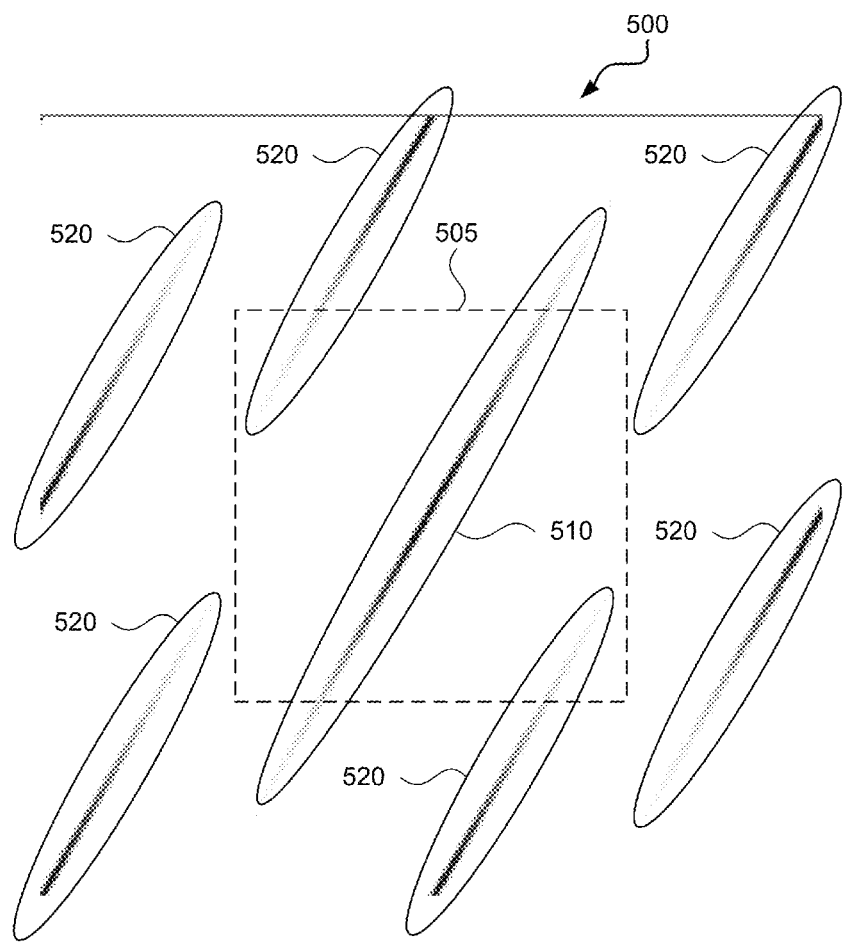
FIG. 5 shows a spectrum with increased bandwidth.

Following orientation estimation, the spectrum of the selected region is calculated such that the Nyquist limit is increased from 0.5 cycles/pixel to one cycle/pixel. This is equivalent to increasing the bandwidth by a factor of two. This is done by a calculate extended spectrum stage 430. An example of such a spectrum 500 is shown in FIG. 5, which shows the original Nyquist limit 505 at 0.5 cycles/pixel, an unwrapped main spectral component or frequency 510 corresponding to the spectrum of the high-resolution image feature, and replica bands 520 resulting from the doubled Nyquist limit. The Nyquist limit may be increased in either the spatial domain or the Fourier domain. A frequency spectrum with increased Nyquist limit is equivalent to an extended frequency spectrum.

Figure 6:
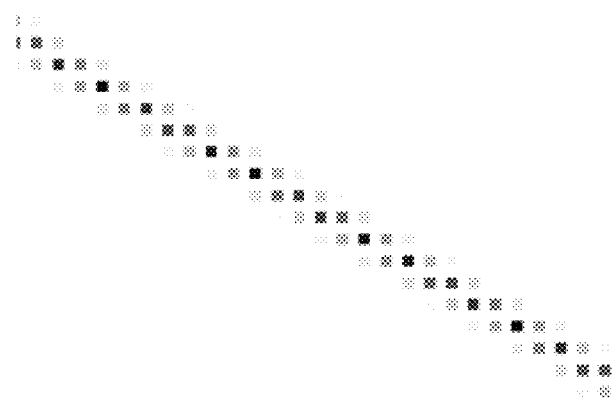
FIG. 6 shows an example of an exploded region corresponding to the region of FIG. 1.

To double the Nyquist limit in the spatial domain, a zero sample is inserted between each pixel of the region. A region resulting from this operation will be referred to as an exploded region. FIG. 6 shows an example of an exploded region corresponding to the region of FIG. 1. For a local region of 32×32 pixels, the resultant exploded region is 64×64 pixels. The spectrum with increased Nyquist limit according to step 430 is then calculated by computing the Discrete Fourier Transform of the exploded region.

Figure 9:
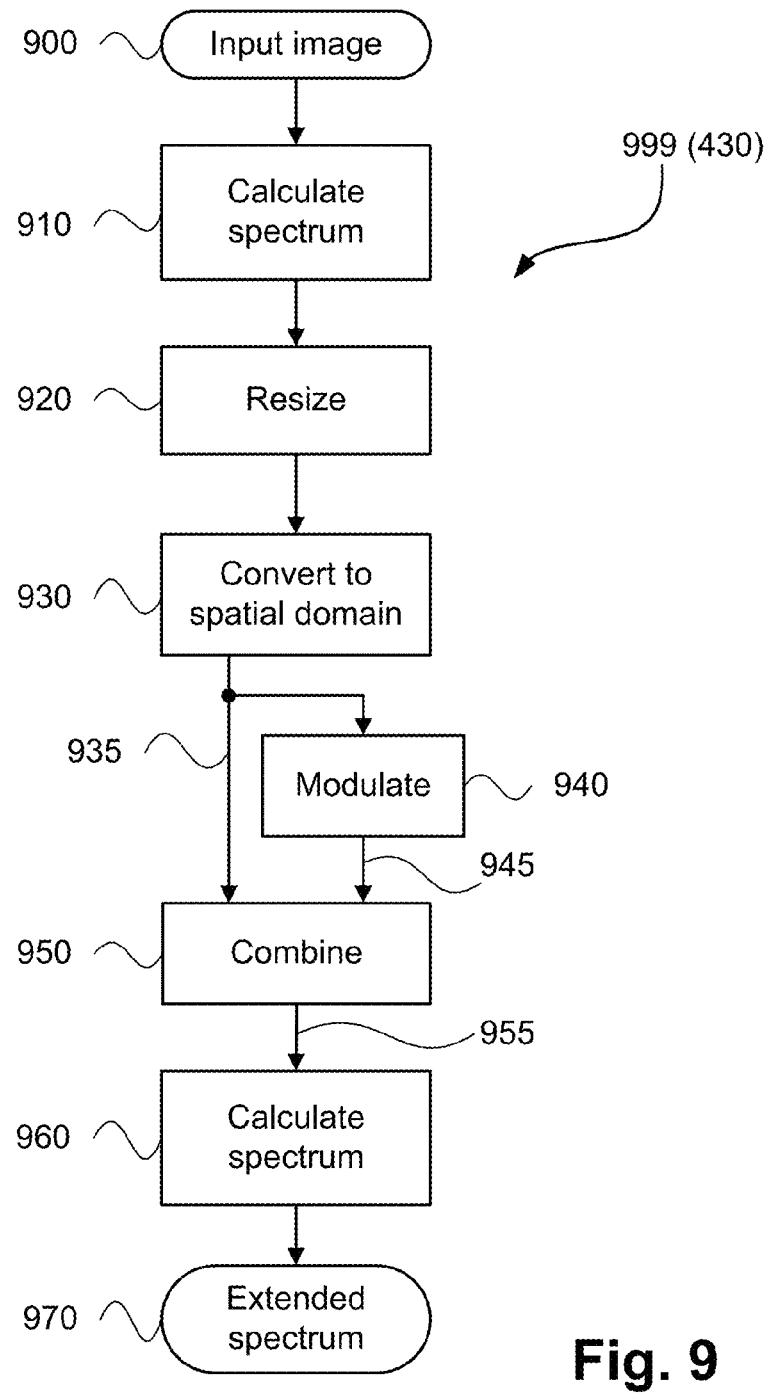
FIG. 9 is a flow diagram of a method to calculate a spectrum with increased bandwidth.

To calculate the spectrum with increased Nyquist limit in the Fourier domain, the spectrum of the local region may be tiled by duplicating the spectrum of the local region in adjacent tiles. An alternative method 999 of calculating an extended spectrum is shown in FIG. 9. The method 999 starts by calculating the discrete Fourier transform (DFT) of the input image 900 by a calculate spectrum stage 910. The input image 900 may be a region or tile of a larger image, for example when the method 999 is used instead in step 430 of the method 499. The spectrum image from step 910 is then resized in step 920 by increasing the size by a factor of two. This is performed by padding the spectrum image with zeros. This is known as Fourier interpolation. The inverse DFT is then calculated by a convert to spatial domain stage 930. The resultant spatial domain image 935 is then modulated at step 940 such that the spectrum of the resultant image is shifted beyond the original Nyquist limit of the input image.

Figure 8:
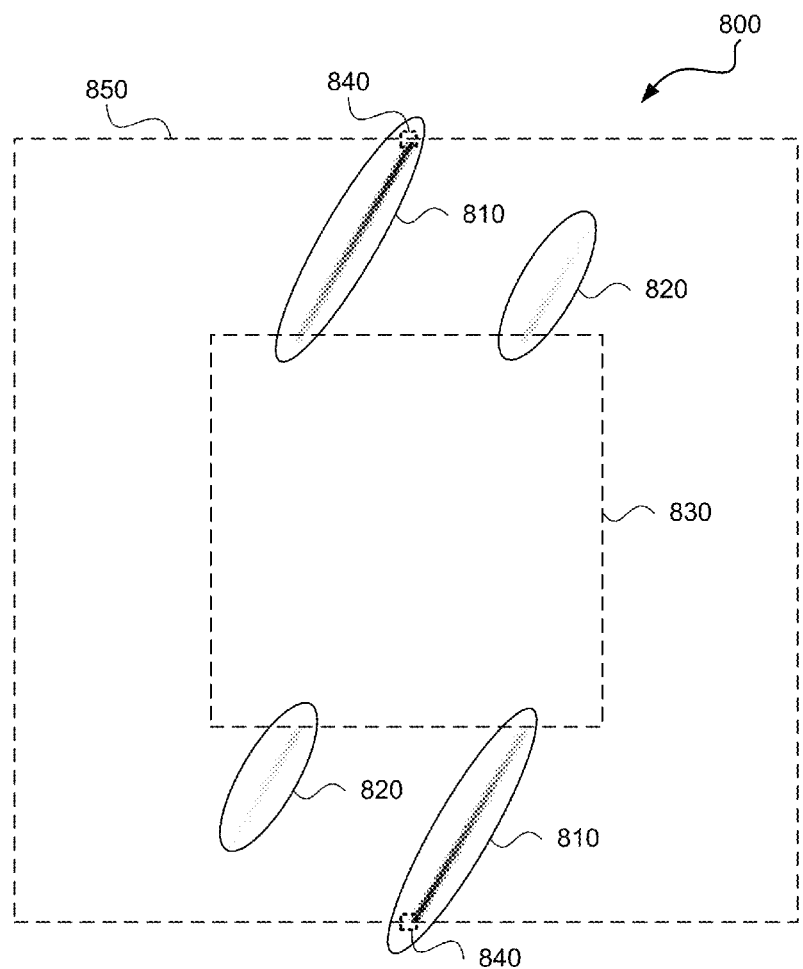
FIG. 8 shows the result of modulating an aliased spectrum.

An example of such a spectrum 800 is shown in FIG. 8, which shows the original Nyquist limit 830 corresponding to the Nyquist limit of the input image 900, the extended Nyquist limit 850, the modulation frequency 840 used in step 940, the main spectral component having two portions 810 courtesy of the modulation, and aliased components 820. The modulation is performed by multiplying the spatial domain image 935 by a cosine image to shift the resultant image beyond the original Nyquist limit. As the image feature corresponding to the spectrum of FIG. 2 is near-vertical, the horizontal frequency of the cosine image is zero and the vertical frequency is equal to the Nyquist limit 850. For a near-horizontal image feature, the vertical frequency of the cosine image is set to zero, and the horizontal frequency is set to the Nyquist limit 850.

After modulation in step 940, the spatial domain image 935 and modulated image 945 are added together by a combine stage 950. Finally, the DFT of the combined image 955 is obtained by a calculate spectrum stage 960, which outputs an extended spectrum 970 of the input image 900.

Figure 7:
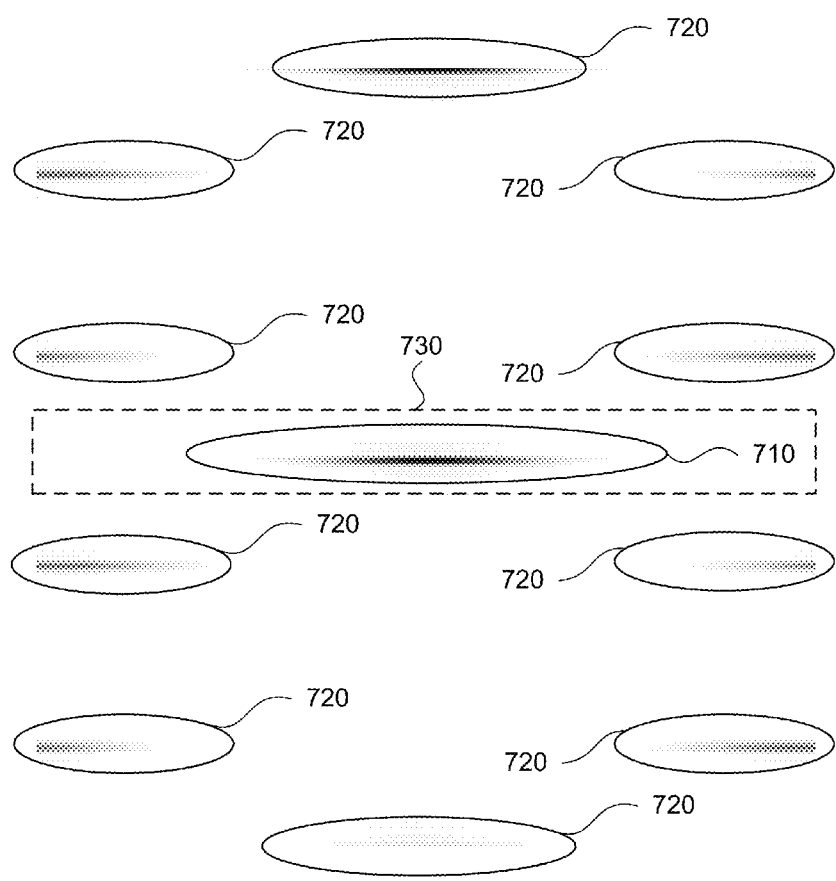
FIG. 7 shows a spectrum aligned to the horizontal sampling axis.

Returning to FIG. 4, as the orientation of the region is known, the spectrum is aligned to a sampling axis by an align spectrum stage 440 which implements a shear or rotation transformation. An example of this is shown in FIG. 7, which shows the result of shearing the spectrum of FIG. 5, whereby for example the main frequency band component 510 is transformed to give component 710, which is aligned to the horizontal axis and lies within a band 730. Shearing the spectrum of FIG. 5 in this way ensures that the band 730 does not contain any replica components 720 and allows filtering using a one dimensional filter.

After the spectrum has been aligned with a sampling axis by the align spectrum stage 440, processing continues to an anti-aliasing stage 450. The purpose of this stage is to apply an anti-aliasing filter to remove the replica components 720, while maintaining the main frequency component 710, such that the resultant spectrum contains only the main frequency component 710. This is done for the case of FIG. 7 using a low-pass filter configured in the vertical direction, in which the pass-band of the low-pass filter corresponds to the band 730, where the replica components 720 are positive and negative frequencies greater than the low-pass band of the filter. Alternatively, a notch filter with several notches corresponding to the location of the replica components 720 may be used.

Following the anti-aliasing filter stage 450, the image is passed to a stage 460 to restore the orientation of the spectrum to that measured by orientation estimation stage 420. This is done using a shear or rotation transformation, and is the inverse of the operation performed by the align spectrum stage 440. An inverse DFT is then applied to the resultant spectrum by a convert to spatial domain stage 470 to form a spatial domain image for the current region. The spatial domain image includes pixels at positions in an output grid from which the upsampled image will be formed. Finally, the spatial domain image is passed to a store stage 480, which writes the spatial domain image of the current region to a corresponding location in the output image, for example stored in the memory 1706.

Processing then continues to a decision stage 485, which determines whether to process the next region by the extract local region stage 410, or, in the event that the entire input image 400 has been processed, to send the image to a resample stage 490. As the process of frequency unwrapping doubles the size of the image, the resample stage 490 is required in order to further resize the image, by up-sampling or down-sampling, to the desired output resolution where appropriate. As aliased frequencies have been recovered, simple data-independent interpolation, such as linear or bicubic interpolation, can be used to determine interpolated pixel values between pixels of the unwrapped double sized image without introducing artefacts. The number of interpolated values is determined using the desired output resolution. The output of the resample stage 490 is the high-resolution image 405, which can be stored by the processor 1705 to memory such as the HDD 1710 as part of the output image.

Where the desired output resolution is simply twice that of the input image, then the unwrapped double size image may be used, and the resampling step 490 is not required. Where for example a desired output resolution 5 times that of the input image is required, then the resampling step 490 is required to interpolate three (3) pixel values between each pair of output pixels of the unwrapped double sized image.

Spatial Domain Implementation of Frequency Unwrapping

Figure 10:
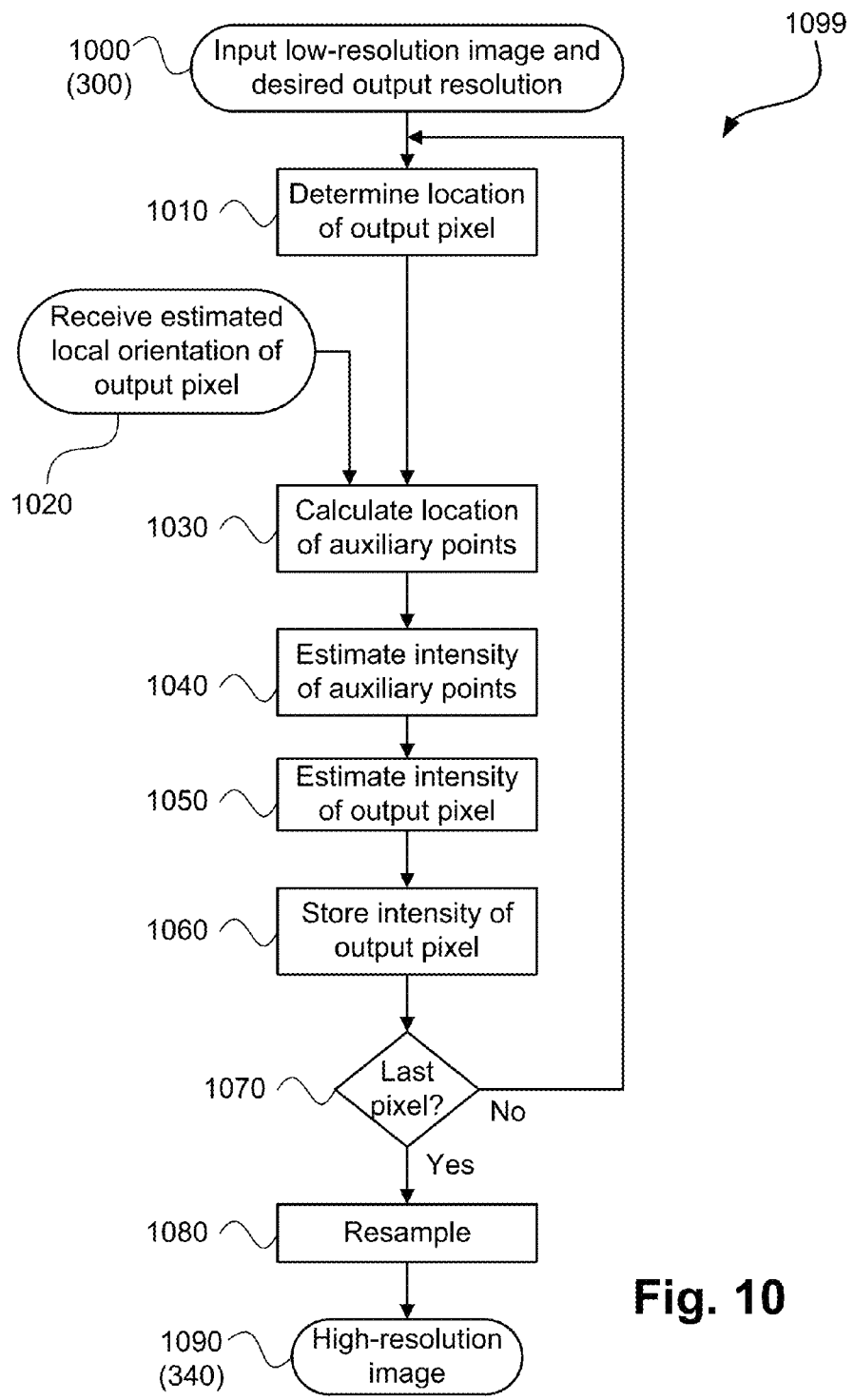
FIG. 10 is a flow diagram of a method to resample an image by frequency unwrapping in the spatial domain.

An alternative to implementing image resampling by frequency unwrapping in the Fourier domain, as shown in FIG. 4, is a spatial domain implementation, shown in a method 1099 of FIG. 10. The method 1099 is input 1000 with a desired output resolution together with a low-resolution image corresponding to the low-resolution image 300 of FIG. 3. The method 1099 outputs a high-resolution image 1090, corresponding to the adaptively upsampled image 340 of FIG. 3. The method of FIG. 10 will be explained with reference to FIG. 11, which shows the relationship between input pixels 1100 formed in an input horizontal/vertical grid of pixel locations, an output pixel 1110 and auxiliary points 1115 for an image feature 1150, in this case a line or edge, in a local region 1180 essentially defined by a gamut of the input pixels 1100. The output pixel 1110 is at an output position in an output grid of pixels in the upsampled image at the desired resolution. Typically, the output grid of pixels aligns with the input grid of pixels in the input image, the difference in resolution notwithstanding.

As a first step, a determine location stage 1010 calculates the location of a current output pixel 1110 in the output image, and a corresponding sub-pixel location in the input image. Using the sub-pixel location in the input image, the local orientation 1160 of the image feature 1150 is estimated by an orientation estimation stage 1020. The local orientation is estimated using an energy tensor, gradient squared tensor, structure tensor or other such method.

Given an estimate of the local orientation 1160, the image feature 1150 is aligned to a sampling axis. For the example in FIG. 11, the image feature 1150 is aligned to the vertical axis 1140, being an axis of the grid of input pixels 1100. This is done by estimating (or assessing) the position and intensity of a set of auxiliary points 1115 along the image feature. First, the position of the auxiliary points 1115 is determined by a calculate auxiliary points stage 1030. The auxiliary points 1115 are positioned along the image feature 1150, either side of the current output pixel 1110. As the image feature 1150 is near-horizontal, the auxiliary points 1115 are positioned to lie on rows, being a horizontal direction of the grid of input image pixels 1100, and thereby at intersections of the horizontal axis of the grid with the image feature (edge) 1150. For a near-vertical image feature, the auxiliary points are constrained to lie on columns being a vertical direction of the input image pixel grid. The number of auxiliary points is proportional to the quality of the anti-aliasing filter, and is typically set to 9. Given the location of the auxiliary points, an estimate of the intensity of each auxiliary point is required, which is calculated by an estimate intensity stage 1040. For a single pixel location, the processes 1030 and 1040 operate to extend the frequency spectrum for the region of the input image pixel and to align the main frequency band of the edge 1150 at least in one direction of the sampling grid within the extended frequency spectrum.

Figure 13:
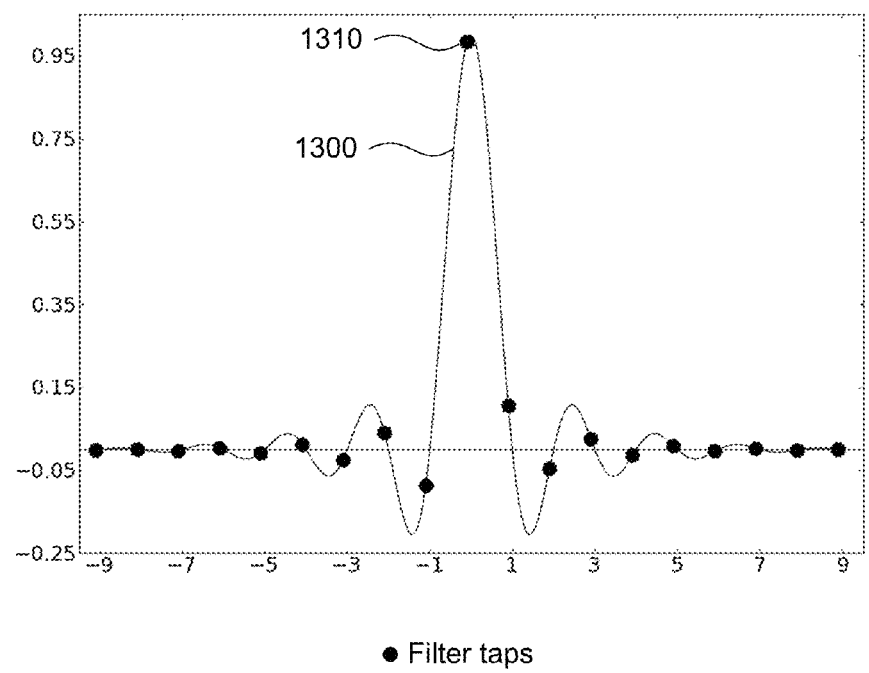
FIG. 13 shows a windowed sinc filter.

To estimate the intensity of the auxiliary points 1115, zero pixels 1130 are first inserted between each input pixel 1100 within the local region associated with the output pixel 1110 to give an exploded local region. The resultant exploded region has an increased Nyquist limit from 0.5 cycles/pixel to one cycle/pixel. Each auxiliary point 1115 in the local region has a corresponding location in the exploded region. The intensity of an auxiliary point is then determined by centering a one-dimensional interpolation filter, such as a windowed sinc filter, on the corresponding point in the exploded region. An example of a suitable interpolation filter is shown in FIG. 13, which shows a continuous windowed sinc filter 1300 and 19-tap discretization 1310. For a near horizontal image feature, the interpolation is applied along the horizontal axis, and for a near vertical image feature, the interpolation is performed along the vertical axis. This has the effect of filtering the main frequency band of the edge 1150, which is synonymous with the edge 1150, with at least one other direction of the sampling grid to remove frequencies associated with replica bands of the extended frequency spectrum.

The computation required by the computer module 1701 and particularly the processor 1705 to estimate the intensity of each auxiliary point using the explode and interpolate method may be significant. A more efficient method of estimating the intensity of each auxiliary point is to perform the interpolation directly in the local region. This is achieved by filtering with a sub-sampled interpolation filter. For example, the discrete filter 1310 may be sub-sampled by a factor of two to produce a 9-tap filter 1210, referred to as an 'odd' filter, and a 10-tap filter 1220, an 'even' filter, as seen in sinc filter 1200 of FIG. 12 (i.e., odd and even filter taps). The intensity of each auxiliary point is estimated by interpolation using either the even or odd filter. The even or odd filter is selected based on the corresponding location of the auxiliary point in the exploded region. That is, if the corresponding location of the auxiliary point is closest to an input pixel, the even filter is selected. Alternatively, if the corresponding location of the auxiliary point is closest to an inserted zero pixel, the odd filter is selected. As was the case for the exploded filter method, interpolation is applied in the horizontal direction for a near-horizontal image feature, and in the vertical direction for a near vertical image feature.

Figure 11:
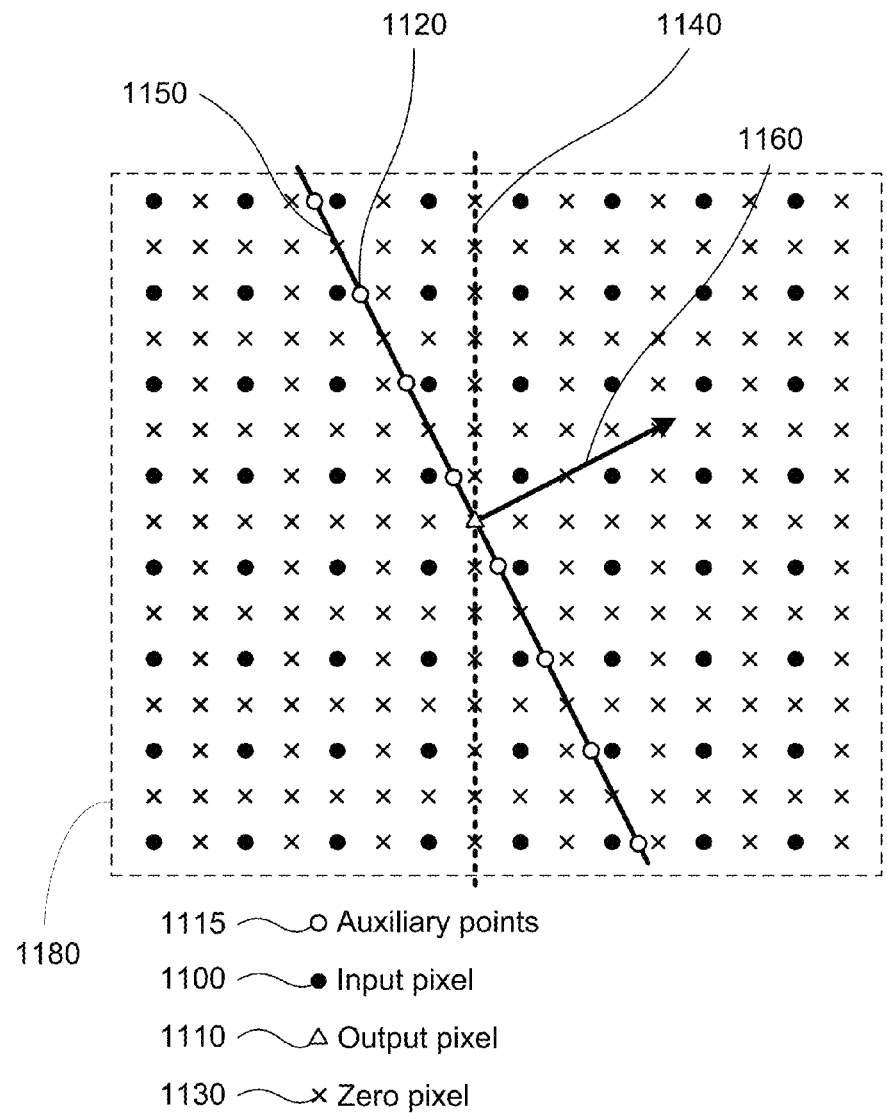
FIG. 11 shows the geometric relationship between an image feature, input pixels, output pixel and auxiliary points.
Figure 12:
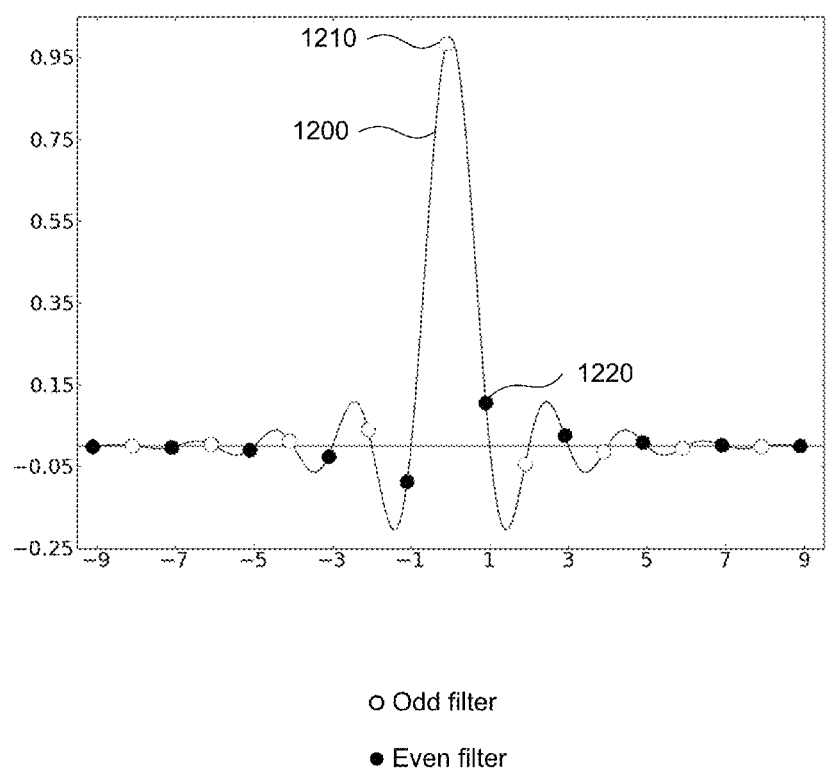
FIG. 12 shows a sub-sampled windowed sinc filter.

Given an estimate of the intensity of each auxiliary point, the intensity of the output pixel may be estimated by an estimate intensity stage 1050, which implements a one-dimensional interpolation filter. The interpolation filter is applied to the auxiliary points, and is equivalent to the anti-aliasing filter 450 used by the method of FIG. 4. As such, the estimate intensity stage 1050 implements either a low-pass filter or notch filter. As the image feature 1150 of FIG. 11 is near-horizontal, the interpolation filter is centred on the y-component of the output pixel 1110. For a near-vertical image feature, the interpolation filter is centred on the x-component.

The value of the output pixel is then stored by a store intensity stage 1060 to the memory 1706 for example, and processing continues to a decision stage 1070. In the decision stage 1070, the processor 1705 determines whether to calculate the location of the next output pixel by the determine output pixel location stage 1010, or, in the event there is no remaining output pixels to process, to send the high-resolution image to a resample stage 1080. As the process of frequency unwrapping doubles the size of the image, the resample stage 1080 is required in order to resize the image to the desired output resolution. As aliased frequencies have been recovered, simple data-independent interpolation, such as linear or bicubic interpolation, can be used without introducing artefacts, to thereby form pixel values at the desired output resolution between pixels of the unwrapped double sized image. Finally, the output of the resample stage 1080 is output to give the high-resolution image 1090.

Description of a Method to Estimate Orientation

Figure 14:
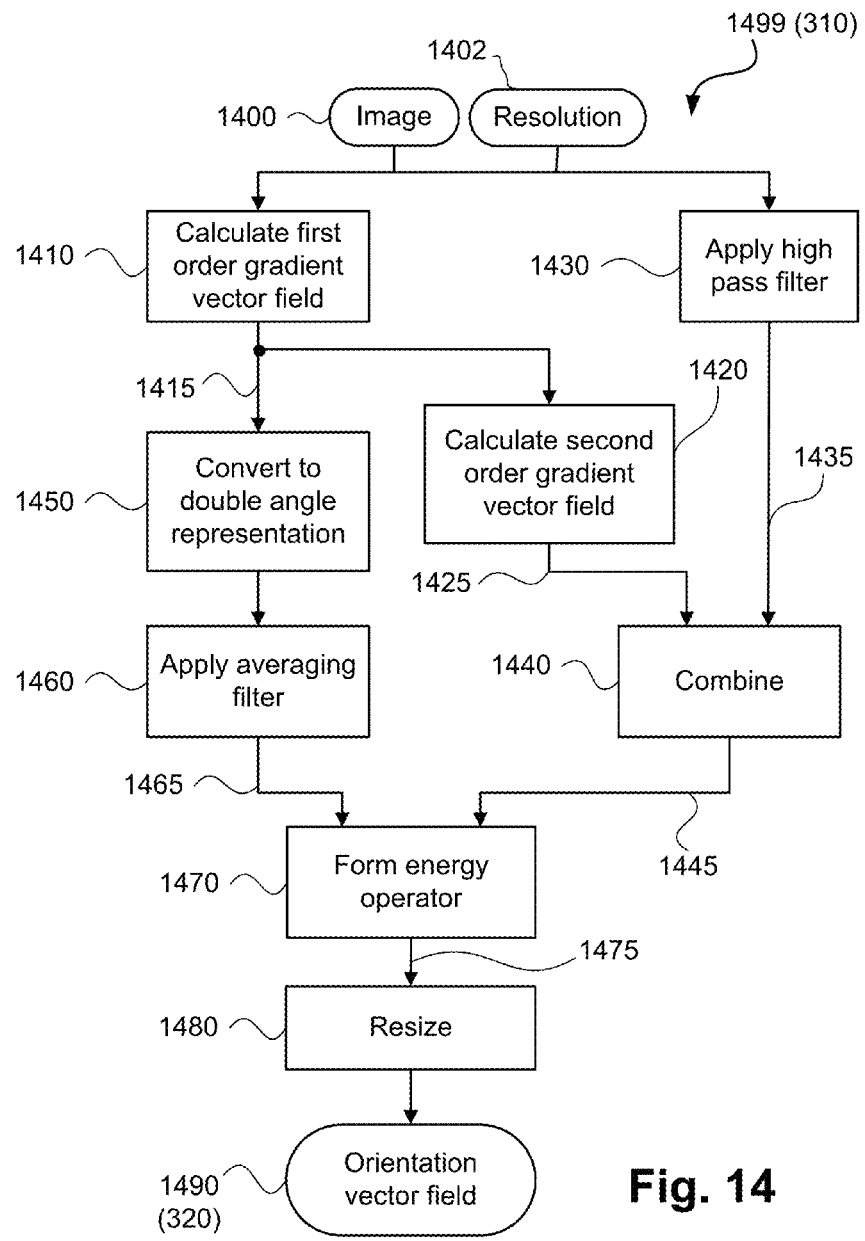
FIG. 14 is a flow diagram of method to estimate the local orientation at each pixel of an image.

FIG. 14 shows an exemplary method 1499 to estimate the local orientation at sub-pixel locations of an image, as for example performed by the orientation filter 310, the estimate 320 being input to the frequency unwrapping methods of FIG. 4 (at step 420) and FIG. 10 (at step 1020). An orientation vector field 1490 is output by the orientation estimation method 1499 for an input image 1400. In addition to an input image 1400, the orientation estimation method 1499 requires an output resolution 1402, such as the desired output resolution, which specifies the resolution of the orientation vector field 1490, thereby forming the inputs to the method 1499. The orientation vector field 1490 may be considered as a complex valued image whereby each pixel value is a complex number consisting of a real part and an imaginary part. The orientation vector field 1490 is obtained from an energy operator which is formed by a first complex image 1465 and a second complex image 1445.

The first complex image 1465 is generated by a calculate first order gradient stage 1410, in which the real part of the complex image 1465 is proportional to the gradient of the input image 1400 in the horizontal direction, and the imaginary part is proportional to the gradient of the input image 1400 in the vertical direction. The horizontal and vertical gradients are calculated by the processor 1705 convolving the input image 1400 with kernels $r_x$ and $r_y$ respectively. The kernels are defined as:

$$r_x = \begin{pmatrix} 1 & 0 & 1 \\ 2 & 0 & -2 \\ 1 & 0 & -1 \end{pmatrix}$$

$$r_y = \begin{pmatrix} 1 & 2 & 1 \\ 0 & 0 & 0 \\ -1 & -2 & -1 \end{pmatrix}$$

As the gradient field is represented in complex space, the 180 degree periodicity of orientation is avoided by converting the gradient field to a double angle representation in stage 1450 by the processor 1705 determining the square of each value of the gradient field. For the purpose of calculating the squares, the vectors in the gradient field are treated as complex numbers.

The first complex image 1465 is then obtained by the processor 1705 applying an averaging filter 1460 to smooth the double angle representation. The averaging filter 1460 may be implemented by convolving the double angle representation with a kernel b. One such kernel is:

$$b = \begin{pmatrix} 1/9 & 1/9 & 1/9 \\ 1/9 & 1/9 & 1/9 \\ 1/9 & 1/9 & 1/9 \end{pmatrix}$$

To calculate the second complex image 1445 that is input to the energy operator stage 1470, a second order gradient field 1425 of the input image 1400 is required. This is calculated at stage 1420. The second order gradient field may also be considered as a complex image, and is calculated by the processor 1705 applying the kernels $r_x$ and $r_y$ to the first order gradient field 1415. The real part of the second order gradient field 1425 is equal to the difference between two real images. The first of these images is formed by convolving $r_x$ and the real part of the gradient field 1415. Similarly, the second image is formed by convolving $r_y$ and the imaginary part of the gradient field 1415. The imaginary part of the second order gradient field 1425 is produced by the processor 1705 doubling the real part of the gradient field 1415, and convolving the result with $r_x$. Equivalently, the imaginary part of the second order gradient field 1425 may be produced by doubling the imaginary part of the gradient field 1415, and convolving the result with $r_y$.

In addition to the second order gradient field 1425, a high-pass filtered image 1435 of the input image 1400 is used to calculate the second complex image 1445. The high-pass filtered image 1435 is produced by a high-pass filter 1430 which is used to remove the DC component of the image 1400 as it will interfere with the orientation estimation method. The high-pass filter 1430 is implemented by the processor 1705 convolving the image 1400 with a kernel h. In this arrangement, the high-pass filter kernel is:

$$h = \begin{pmatrix} -1/16 & -2/16 & -1/16 \\ -2/16 & 12/16 & -2/16 \\ -1/16 & -2/16 & -1/16 \end{pmatrix}$$

The second complex image 1445 is then formed by a combine stage 1440. This is achieved by the processor 1705 multiplying the high-pass filtered image 1435 by the second order gradient field 1420. The multiplication is implemented as a per-pixel operation.

Given the two complex images 1465 and 1445, a complex energy operator is then calculated at stage 1470 by the processor 1705 subtracting the second complex image 1445 from the first complex image 1465. The result of this operation can also be considered a complex image 1475. The complex energy operator image 1475 is then interpolated to the desired output resolution by a resize stage 1480. This may be implemented by the processor 1705 applying nearest neighbour interpolation or linear interpolation separately to the real and imaginary parts of the complex energy operator image using the input resolution 1402. Alternatively, the horizontal and vertical gradients may be calculated directly by the processor 1705 at sub-pixel locations in the image 1400 defined by the resolution 1402 by use of polyphase filtering. This allows the orientation at sub-pixel locations of the input image 1400 to be estimated directly without interpolation. Each pixel of the orientation vector field 1490 output by the resize stage 1480 can be considered as a vector representing the orientation, in a double angle form, of a corresponding location in the input image 1400.

Alternate Application of Image Resampling by Frequency Unwrapping

Figure 15:
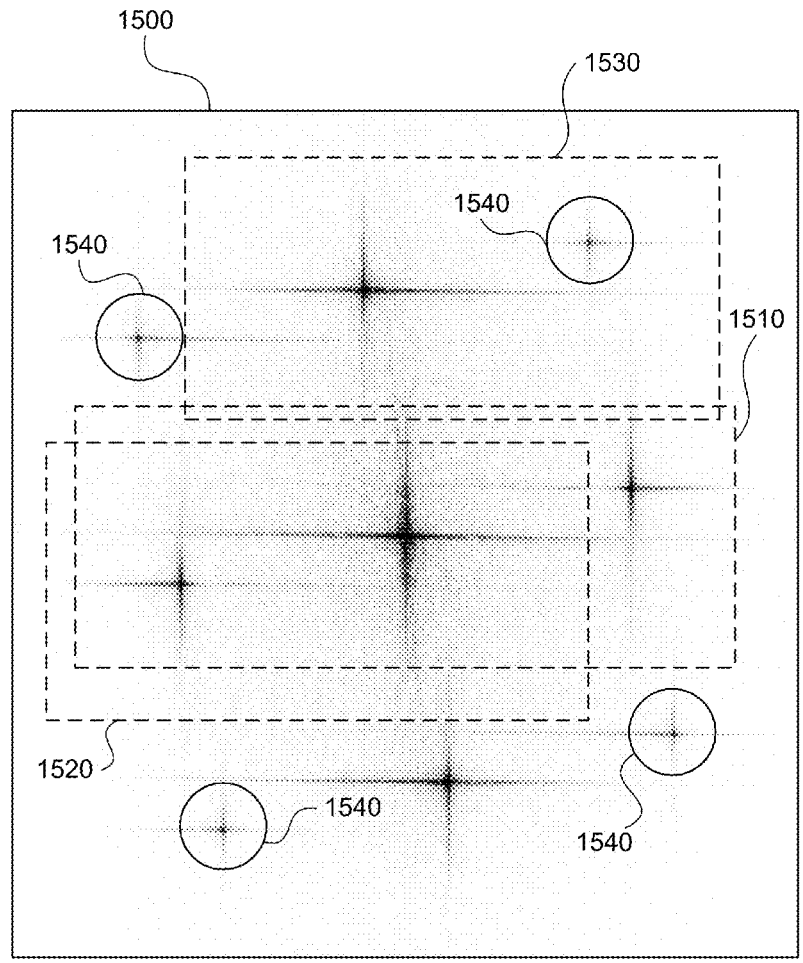
FIG. 15 illustrates a magnitude spectrum of an image captured by an interferometer.

Resampling by frequency unwrapping may also be used to remove artefacts from images which contain several sub-images. For example, FIG. 15 shows the magnitude spectrum 1500 of an image captured by an interferometer. The spectrum 1500 of FIG. 15 features a DC component 1510, horizontal component 1520, vertical component 1530 and harmonic components 1540. The DC component 1510, horizontal component 1520, and vertical component 1530 are considered sub-spectrums, as each component corresponds to a particular sub-image. Due to the carrier or main frequency, and bandwidth of each sub-spectrum, there is significant interference between each sub-spectrum and the harmonic components 1540. This interference causes severe artefacts when extracting the corresponding sub-image of each sub-spectrum. These artefacts may be reduced by resampling the extracted sub-image by frequency unwrapping according to the present disclosure.

Figure 16:
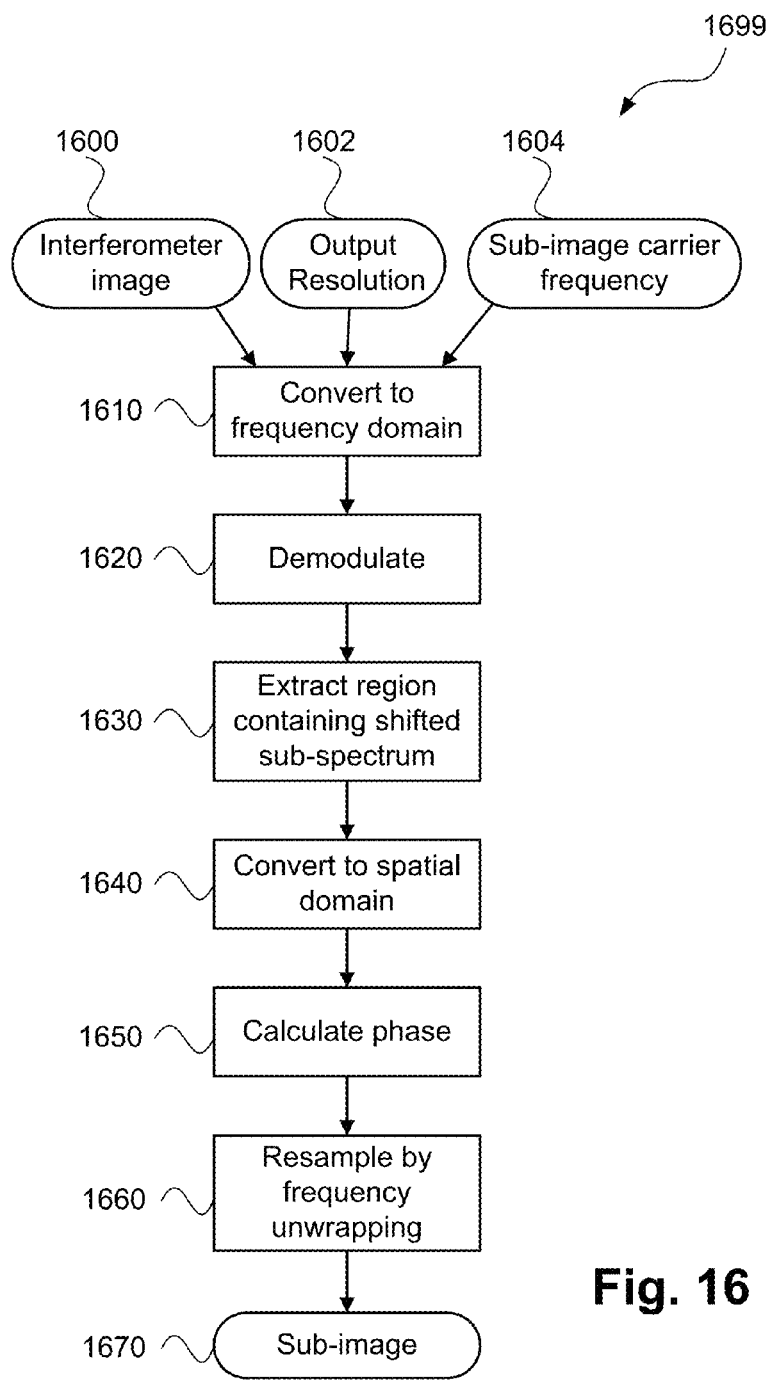
FIG. 16 is schematic flow diagram of a method to extract a sub-image corresponding to a sub-spectrum of FIG. 15.

FIG. 16 shows a flow diagram of a method 1699 to extract a sub-image corresponding to a sub-spectrum of FIG. 15. An interferometer image 1600, a desired output resolution 1602, and carrier frequency 1604 of the sub-image are each input to the method which outputs a sub-image 1670.

The method 1699 starts at a convert to frequency domain 1610 stage, where the processor 1705 calculates the DFT of the interferometer image 1600. Following this, the sub-spectrum is shifted to DC, based on the carrier frequency 1602 of the sub-image, by a demodulate stage 1620. In the demodulate stage 1620, the processor 1705 executes a process similar to a complement of the modulate stage 940 of FIG. 9. A region containing the sub-spectrum is then extracted by the processor 1705 at step 1630, and converted to the spatial domain by stage 1640, where the processor 1705 implements an inverse DFT. As the image 1600 was captured by an interferometer, the phase of the image 1600 is calculated by stage 1650. The output of the calculate phase stage 1650, which is a phase image, is then passed to a resample by frequency unwrapping stage 1660 which implements one of the methods described by FIG. 4 or FIG. 10. The output of the resample stage 1660 is a sub-image 1670 with reduced artefacts.

INDUSTRIAL APPLICABILITY

The arrangements described are applicable to the computer and data processing industries and particularly for the removing of jagged edges from images, particularly upon downsampling of the images to improve their resolution.

The foregoing describes only some embodiments of the present invention, and modifications and/or changes can be made thereto without departing from the scope and spirit of the invention, the embodiments being illustrative and not restrictive.

We claim:

1. A method of determining at least one image value of a corresponding desired output position on an output grid of an output image from an input image on an input grid, the method comprising:
    (a) determining, in a localised region of the input image, an orientation of an edge passing through the output position;
    (b) extending a frequency spectrum for the region of the input image;
    (c) aligning a main frequency band of the edge in the extended frequency spectrum parallel to a first sampling axis of a grid based on the orientation of the edge, wherein the grid is selected from the set of the input and output grids;
    (d) filtering the aligned main frequency band along a second sampling axis of the grid, orthogonal to the first sampling axis, the filter removing frequencies associated with replica bands and maintaining the main frequency band;
    (e) determining the image value from the filtered edge at the desired output position; and
    (f) storing the determined image value as part of the output image.

2. A method according to claim 1, wherein the first sampling axis of the input image is horizontal.

3. A method according to claim 1, wherein the first sampling axis of the input image is vertical.

4. A method according to claim 1, wherein the main frequency band is aligned by shearing.

5. A method according to claim 1, wherein the main frequency band is aligned by rotation.

6. A method according to claim 1, wherein the step of extending the frequency spectrum includes filtering the region with a sub-sampled interpolation filter.

7. A method according to claim 1, wherein the extending the frequency spectrum comprises:
- determining a spectrum image of at least a portion of the input image;
- resizing the spectrum image;
- converting the spectrum image into the spatial domain to form a spatial image;
- modulating the spatial image to shift a spectrum thereof beyond a Nyquist limit of the input image;
- combining the spatial image and the modulated spatial image to form a combined image; and
- determining a spectrum of the combined image to form an extended spectrum of the input image.

8. A method according to claim 1, further comprising:
(g) performing steps (a) to (f) for at least one further image value of the output image; and
(h) resampling the output image by interpolating at least one further image value of the output image between the image value and the further image value.

9. A method according to claim 8, wherein step (g) comprises performing steps (a) to (f) for a region of the input image, and step (h) comprises resampling across the region.

10. A method of upsampling a low-resolution input image to form a high-resolution output image at a desired output resolution, said method comprising:
- determining a local orientation value of a localised region in the input image;
- default upsampling the input image using the desired output resolution to form a first image;
- orientation adaptively upsampling the input image at each localised region thereof using the determined local orientation value according to the method of claim 1 to form a second image; and
- combining the first image and the second image using the determined local orientation value to form the output image at the desired resolution.

11. A method according to claim 10, wherein the combining comprises selecting an output pixel value at the desired resolution from one of the first image and the second image.

12. A method according to claim 10, wherein the determining of the local orientation value for a region of the input image comprises determining an orientation of a high frequency transition in or passing through a localised region of the input image corresponding to a desired output sample position in the output image.

13. A method according to claim 12, wherein the determining comprises:
(i) determining a first complex image by averaging and double angle representation obtained from a first order gradient field of the input image;
(ii) determining a second complex image by combining a high-pass filtered image of the input image with a second order gradient field obtained from the first order gradient field of the input image;
(iii) forming an energy operator image from the complex images; and
(iv) resizing the energy operator image using the desired output resolution to form an orientation vector field of the input image at the desired output resolution.

* * * * *